(12) United States Patent
Kennelly

(10) Patent No.: US 10,156,079 B2
(45) Date of Patent: Dec. 18, 2018

(54) COUPLING AN UPPER END OF A HOLLOW SECTION COLUMN TO A BUILDING UNIT SUPPORT

(71) Applicant: Illinois Tool Works Inc., Glenview, IL (US)

(72) Inventor: Bernard Kennelly, North Balgowlah (AU)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/501,356

(22) PCT Filed: Aug. 5, 2015

(86) PCT No.: PCT/AU2015/050444
§ 371 (c)(1),
(2) Date: Feb. 2, 2017

(87) PCT Pub. No.: WO2016/019438
PCT Pub. Date: Feb. 11, 2016

(65) Prior Publication Data
US 2017/0226751 A1    Aug. 10, 2017

(30) Foreign Application Priority Data
Aug. 5, 2014    (AU) ............................... 2014903029

(51) Int. Cl.
*E04B 9/00*    (2006.01)
*E04F 15/024*    (2006.01)
(Continued)

(52) U.S. Cl.
CPC ........ *E04F 15/02464* (2013.01); *E04B 1/185* (2013.01); *E04B 1/2403* (2013.01);
(Continued)

(58) Field of Classification Search
CPC .......... E04B 1/185; E04B 1/2403; E04B 1/92; E04B 1/2608; E04B 2001/2415;
(Continued)

(56) References Cited

U.S. PATENT DOCUMENTS 5,622,356 A * 4/1997 Duggan ............... E04H 12/2292
256/1
5,901,525 A * 5/1999 Doeringer ........... E04H 12/2253
248/519

(Continued)

FOREIGN PATENT DOCUMENTS

JP    2012-165854    9/2012

OTHER PUBLICATIONS

International Search Report and Written Opinion for International Application No. PCT/AU2015/050444 dated Nov. 17, 2015 (16 pages).

*Primary Examiner* — Chi Q Nguyen
(74) *Attorney, Agent, or Firm* — Neal, Gerber & Eisenberg LLP

(57) ABSTRACT

A fitting for coupling an open upper end of a hollow section column to a support via which a building unit is to be supported on the column. The fitting comprises a body portion configured to be received in the open upper end of the column and rim portions that extend laterally outwardly from an upper end of the body portion so as to engage edge sections of the column at its upper end when the body portion is received in the open upper end.

22 Claims, 13 Drawing Sheets

(51) Int. Cl.
*E04C 3/32* (2006.01)
*E04B 1/18* (2006.01)
*E04B 1/24* (2006.01)
*E04B 1/26* (2006.01)
*B21D 53/36* (2006.01)
*E04B 1/00* (2006.01)

(52) U.S. Cl.
CPC .............. *E04B 1/2608* (2013.01); *E04C 3/32* (2013.01); *E04F 15/02458* (2013.01); *B21D 53/36* (2013.01); *E04B 1/0007* (2013.01); *E04B 2001/2415* (2013.01); *E04B 2001/2463* (2013.01)

(58) Field of Classification Search
CPC ...... E04B 2001/2421; E04C 3/32; E04C 3/30; E04F 15/02458; E04F 15/02464; E04F 15/02183; E04F 15/0247; E04F 2015/02127; B21D 53/36; E04D 11/007; E04D 27/42; E04H 12/2269; E04H 12/2215; E04H 12/2292
USPC ... 52/126.4, 126.6, 297, 298, 300, 704, 715, 52/712; 108/150, 144.11; 248/530
See application file for complete search history.

(56) References Cited

U.S. PATENT DOCUMENTS

| | | | | |
|---|---|---|---|---|
| 6,073,416 | A * | 6/2000 | Peter | E04H 12/2292 248/519 |
| 6,585,454 | B1 * | 7/2003 | Fisher | E02B 3/068 405/203 |
| 6,718,710 | B2 * | 4/2004 | Platt | E04F 11/1812 52/296 |
| 6,799,407 | B2 | 10/2004 | Saldana | |
| 6,948,283 | B2 * | 9/2005 | Burkart | B29C 33/005 248/346.01 |
| 7,455,282 | B2 * | 11/2008 | Platt | E04F 11/1812 256/1 |
| 7,850,148 | B2 * | 12/2010 | Collins, IV | E04H 17/20 248/156 |
| 8,567,743 | B2 | 10/2013 | Ehrhardt et al. | |
| 9,850,675 | B2 * | 12/2017 | Leary | E04H 12/2253 |
| 2006/0022189 | A1 * | 2/2006 | Collins, IV | E04H 12/2261 256/65.14 |
| 2006/0038163 | A1 * | 2/2006 | Ricci | E04H 12/2292 256/1 |
| 2007/0138361 | A1 | 6/2007 | Poce | |
| 2008/0105172 | A1 | 5/2008 | Repasky | |

* cited by examiner

COUPLING AN UPPER END OF A HOLLOW SECTION COLUMN TO A BUILDING UNIT SUPPORT

PRIORITY CLAIM

This patent application is a national stage entry of PCT Application No. PCT/AU2015/050444, which was filed on Aug. 5, 2015, which claims priority to and the benefit of Australian Patent Application No. 2014903029, which was filed on Aug. 5, 2014, the entire contents of each of which are incorporated herein by reference.

FIELD

The present disclosure relates to construction of buildings using prefabricated building units, particularly (though not exclusively) floor panels or cassettes. More particularly, the present disclosure relates to coupling of an upper end of a hollow section column to a building unit.

BACKGROUND

There are a number of current trends in the building industry, including trends towards smaller lot sizes, larger houses with more open spaces, and a greater focus placed on site safety, which have given rise to comparatively more large and heavy components and an increased use of cranes, scaffolding, and systems to protect installers working at heights, with attendant increases in site costs. Becoming increasingly more attractive and competitive, therefore, is offsite prefabrication of components, panels, and modules, including in particular floor panels or "cassettes".

Such cassettes require foundations. The traditional poured concrete slab foundation, given its inbuilt inaccuracies and susceptibility to movement under adverse conditions, as well as the level of skill required to install it satisfactorily and the relatively long time required for it to cure, is increasingly being replaced with quicker, simpler and cheaper foundations. Where the site is sloping or the floor level is to be raised above the natural ground level, there is generally a need for a post/column, which commonly comprises a square hollow steel section, and fittings at either end of it to connect it at its top end to the floor system and at its bottom end to the foundation system. It is important that these fittings be as economical, versatile, and quick-to-install as possible.

SUMMARY

According to a first aspect of the present disclosure, there is provided a fitting for coupling an open upper end of a hollow section column to a support via which a building unit is to be supported on the column, the fitting comprising a body portion, configured to be received in the end, and rim portions which extend laterally outwardly from an upper end of the body portion so as to engage edge sections of the column at the upper end when the body portion is so received.

The support may form a part of the building unit, e.g., it may comprise, for example, a truss of the building unit, or instead be additional to the building unit, e.g., comprise one or more bearers on which the building unit is supported.

In certain embodiments, the building unit comprises a panel-like building unit. In one embodiment of the present disclosure, the building unit comprises a floor panel or cassette. In an alternative embodiment of the present disclosure, the building unit may instead comprise, for example, a roof module or a wall panel.

In certain embodiments, the body portion has a cross-sectional configuration complementary to a transverse cross-sectional configuration of an interior of the column, whereby to form a substantially size-for-size fit therewith when the body portion is received in the end.

In certain embodiments, the body portion has a cross-sectional configuration which is such that the body portion engages walls of the column to preclude rotation of the fitting about a longitudinal axis of the column when the body portion is received in the upper end.

In certain embodiments, the cross-sectional configuration of the body portion is polygonal.

In certain embodiments, the cross-sectional configuration of the body is substantially rectangular. The cross-sectional configuration of the body may be substantially regular rectangular, i.e., substantially square.

In certain embodiments, the fitting is bent from a shaped, single piece of plate.

In certain embodiments, the fitting further comprises at least one flange portion extending from a laterally outer end of the rim portion to be securable to the support.

In certain embodiments, the fitting further comprises flange portions, each flange portion extending from a laterally outer end of a respective one of the rim portions to be securable to the support.

In one embodiment of the present disclosure, at least one of the flange portions projects laterally outwardly.

In one embodiment of the present disclosure, at least one of the flange portions projects upwardly.

In certain embodiments, the or each flange portion is integrally formed with the rim portion from the end of which it extends.

In certain embodiments, the or each flange portion is configured with at least one hole therethrough to receive a fastener for securing the flange portion to the support.

In certain embodiments, the body portion is substantially hollow.

In certain embodiments, the body portion is upwardly opening. In certain embodiments, the body portion is configured in the form of a bowl.

In certain embodiments, the body portion is configured with at least one hole therethrough, through which a respective tie-down rod for tying down the building unit can be received when the body portion is received in the upper end. In certain embodiments, the or each hole through the body portion extends through a base of the body portion.

In certain embodiments, the fitting has side walls at least one of which is configured with one or more holes therethrough, the or each hole being arranged to receive therethrough a fastener inserted through a corresponding hole in a side wall of the column.

According to a second aspect of the present disclosure, there is provided a seat for the fitting, the seat being receivable in the body portion such that an uppermost upwardly facing surface thereof is substantially flush with upwardly facing surfaces of the rim portions and thus engages the support so as to transfer loads therefrom to the base of the body portion.

In certain embodiments, the seat has an exterior cross-sectional configuration complementary to an interior cross-sectional configuration of the body portion, whereby to form a substantially size-for-size fit with the body portion when received therein.

In certain embodiments, the seat is generally hollow and has a top wall and side walls extending downwardly from the top wall so as to be downwardly opening. In certain embodiments, each side wall is arranged to abut a respective side wall of the body portion.

In certain embodiments, the insert is bent from a shaped, single piece of plate.

In certain embodiments, the seat has a polygonal cross-sectional configuration. In certain embodiments, the seat has a substantially rectangular cross-sectional profile. The seat may have a substantially square cross-section.

In certain embodiments, the seat has a top wall formed with at least one hole therethrough, through which a respective tie-down rod for tying down the building unit can be received when the body portion is received in the upper end.

In certain embodiments, the seat has side walls, at least one of which is configured with one or more holes therethrough, the or each hole being arranged to receive therethrough a fastener inserted through a corresponding hole in a sidewall of the fitting and/or a corresponding hole in a side wall of the column.

According to a third aspect of the present disclosure, there is provided an assembly comprising the fitting and the column, wherein the body portion is received in the upper end such that the rim portions engage the edge sections.

In one embodiment of the present disclosure, the assembly further comprises at least one tie-down rod, the or each rod passing through a hole through the body portion. In certain embodiments, the or each tie-down rod terminates at a level not higher than upwardly facing surfaces of the rim portions and is secured against a base of the body portion by a fastener which is threadably engaged with the tie-down rod and likewise terminates at a level not higher than the upwardly facing surfaces.

In certain embodiments, the assembly further comprises a base to which a lower end of the column is secured, the base being secured to the ground by pegs or stakes which pass therethrough and have been driven into the ground.

In the assembly according to one embodiment of the present disclosure, the or each flange is secured to the support via at least one fastener passing through a hole through the flange.

In the assembly according to one embodiment of the present disclosure, the assembly is received in the body portion such that the uppermost upwardly facing surface thereof is substantially flush with the upwardly facing surfaces of the rim portions.

According to a fourth aspect of the present disclosure, there is provided a method of forming the fitting, comprising bending a blank to form the fitting. In certain embodiments, the blank consists of a single piece of plate. In certain embodiments, the blank comprises a central portion and tongue portions which are integral with and project laterally outwardly from the central portion, and the method includes forming bends at junctions between the tongue portion and central portion such that the tongue portions project upwardly from the central portion whereby the tongue portions define side walls of the fitting and the central portion defines a base of the fitting, the side walls and base defining the body. In certain embodiments, the method further includes bending each tongue portion about a transverse axis so as to form a respective laterally outwardly projecting portion of the tongue which defines a respective rim portion. At least one flange portion may be defined by a respective laterally outwardly projecting portion, laterally outward of the respective rim portion. At least one flange portion may be formed by bending a respective laterally outwardly projecting portion about a transverse axis such a distal end portion of the respective tongue portion projects upwardly.

According to a fifth aspect of the present disclosure, there is provided, for forming the fitting, the blank.

In certain embodiments, the blank is configured with at least one hole arranged to receive therethrough a tie-down rod in the fitting and/or at least one hole arranged to receive a fastener to secure the fitting to the support and/or at least one hole arranged to secure the fitting to the column, the or each hole in certain embodiments being punched.

According to a sixth aspect of the present disclosure, there is provided a method of forming the seat, comprising bending a blank to form the seat. In certain embodiments, the blank for forming the seat consists of a single piece of plate. In certain embodiments, that blank comprises a central portion and tongue portions which are integral with and project laterally outwardly from the central portion, and the method includes forming bends at junctions between the tongue portion and central portion such that the tongue portions project downwardly from the central portion to define side walls of the seat and the central portion defines a top wall of the seat.

According to a seventh aspect of the present disclosure, there is provided the blank for forming the seat.

In certain embodiments, the blank for forming the seat is configured with at least one hole arranged to receive therethrough a tie-down rod in the seat and/or at least one hole arranged to receive a fastener to secure the seat to the fitting and, the or each hole in certain embodiments being punched.

BRIEF DESCRIPTION OF THE DRAWINGS

The present disclosure is described, by way of non-limiting example only, with reference to the accompanying drawings, as set out below.

DETAILED DESCRIPTION

Figure 1:
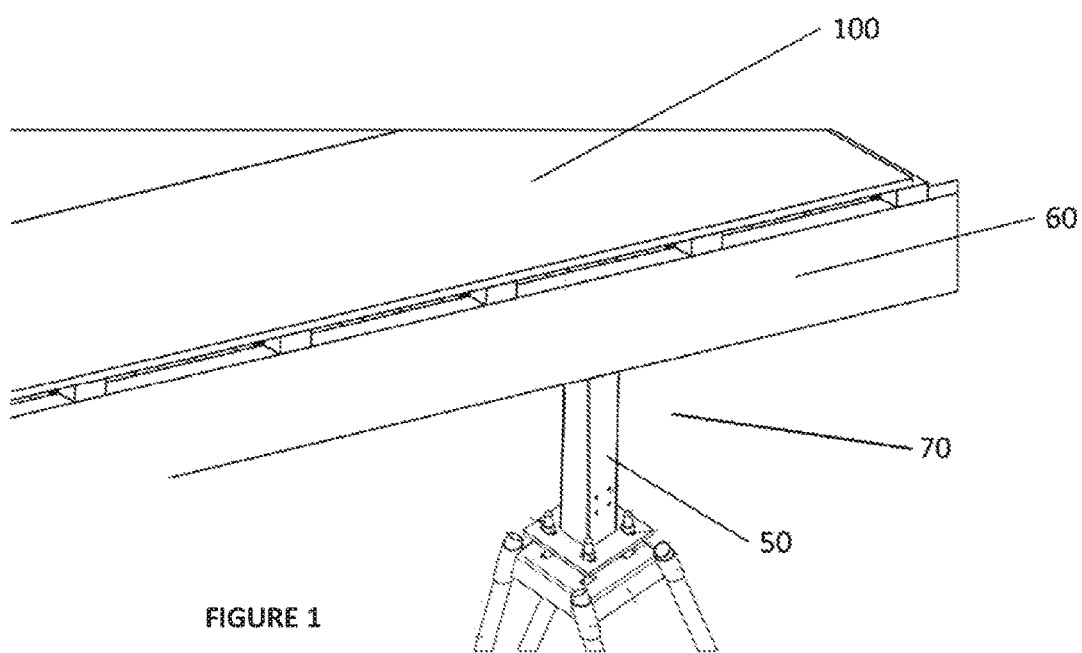
FIG. 1 is a perspective view of an assembly comprising a column, a bearer, and a floor cassette supported by the column via the bearer, in accordance with one embodiment of the present disclosure.
Figure 2:
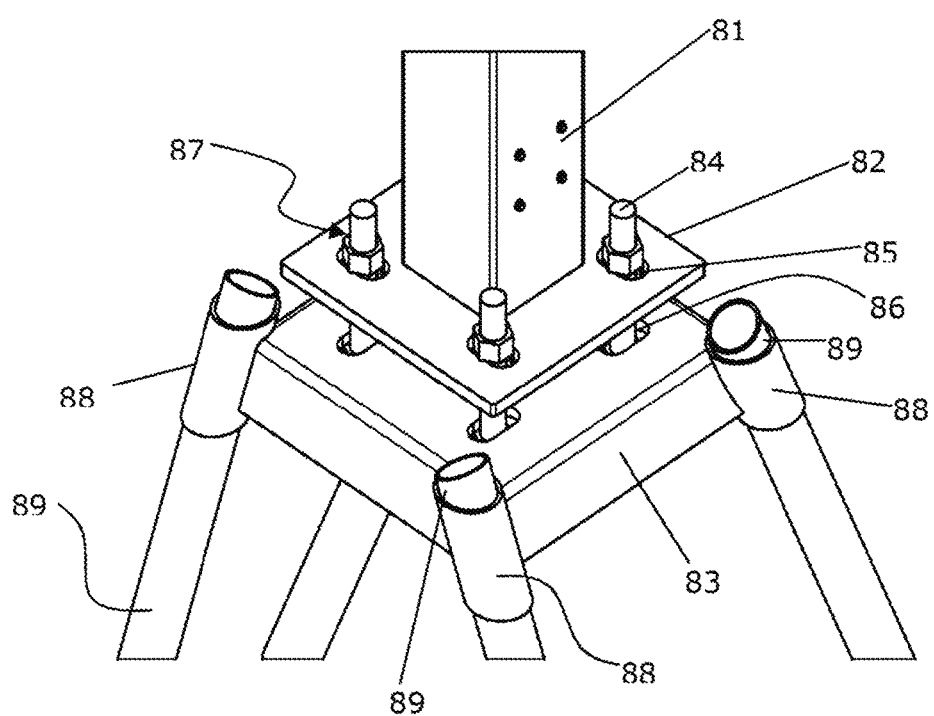
FIG. 2 is a perspective view showing an arrangement via which a lower end of the column is secured to the ground.

Referring to FIG. 1, certain embodiments of the present disclosure relate to coupling of the upper end of a column 50 to a support, such as a bearer 60, via which a prefabricated building unit, such as a floor cassette 100, is to be supported over the ground 70 by the column 50.

The column 50 comprises an upright length of steel square hollow section secured at a lower end thereof, via a bracket 81, to a base plate 82, the latter being secured to a flat top wall of a base support 83 via bolts 84 received through aligned slotted holes 85 and 86 in the base plate 82 and top wall of the base support 83, each bolt 84 being secured by a respective nut 87. The slots 85 extend along axes which are perpendicular to those along which the slots 86 extend, permitting positional adjustment, relative to the base support 83, of the base plate 82, and thus the column 50, in a horizontal plane. Fixed to corners of the base support 83 are sleeves 88, through which stakes 89, in the form of steel tubes, are inserted and driven into the ground, the sleeves 88 being arranged at differing angles to the ground surface, whereby the base support 83, and thus the column 50, is secured firmly to the ground. The arrangement defined by the base support 83, sleeves 88, and tubes 89 is marketed in Australia under the trade mark SUREFOOT.

Figure 3:
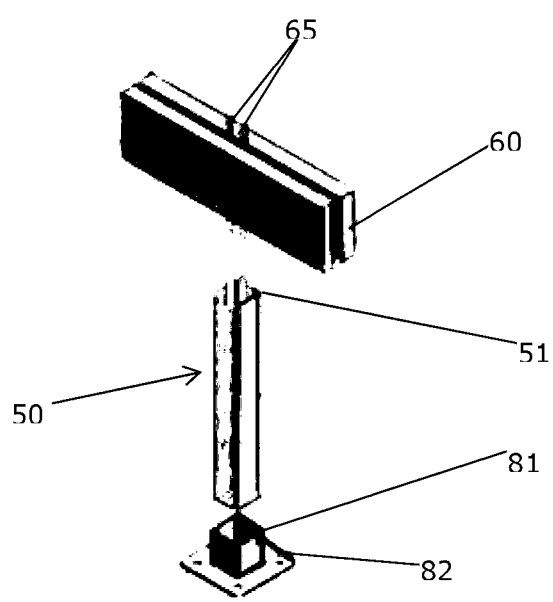
FIG. 3 is a perspective view showing details of the column, including an upper end thereof, as well as the bearer and rods which may be used to tie down the cassette/bearer.

Shown in FIG. 3 are details of an open upper end 51 of the column 50 and details of a typical configuration that the bearer 60 may assume. Tie-down rods 65 may, if appropriate, be installed to tie the bearer 60 and cassette 100 down, as will be described in further detail later.

Figure 4:
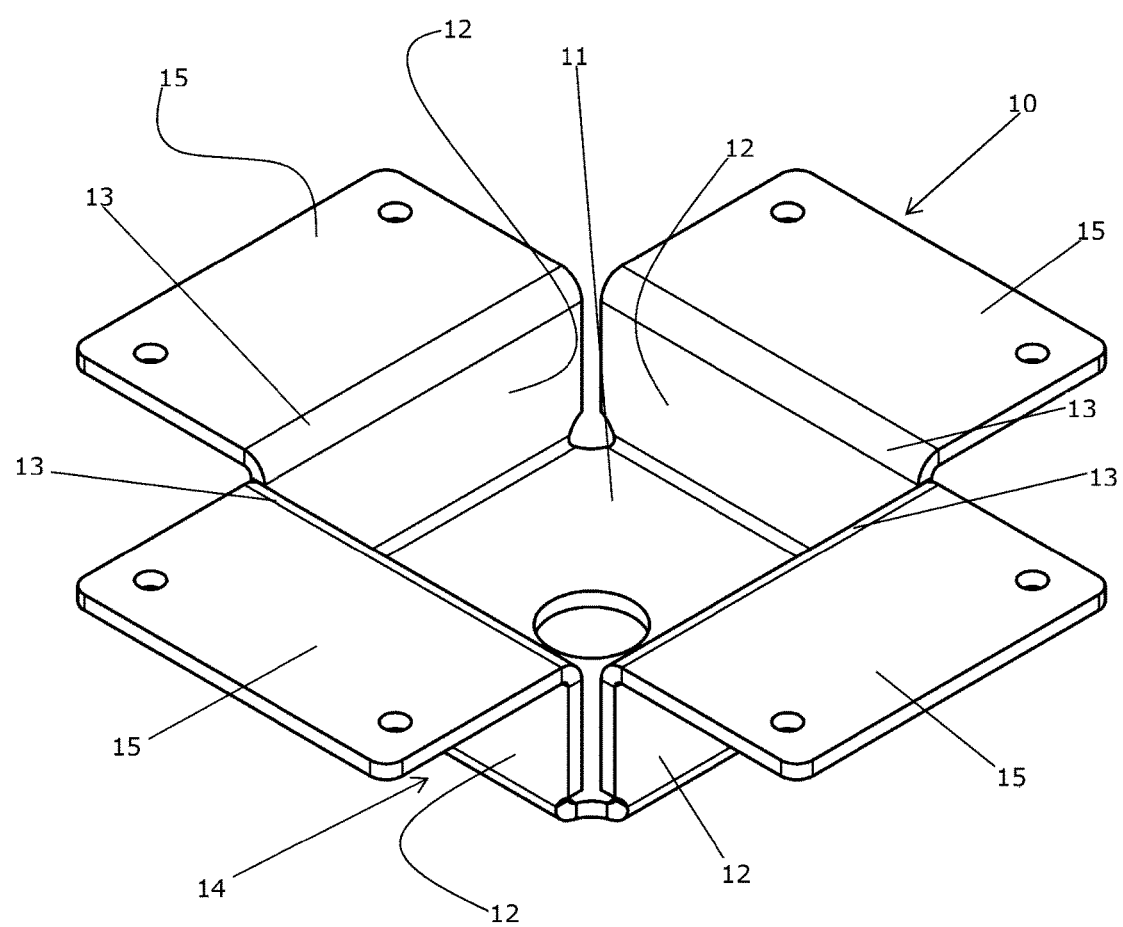
FIG. 4 is a perspective view of an end cap for coupling an upper end of the column to the bearer in accordance with one embodiment of the present disclosure.
Figure 5:
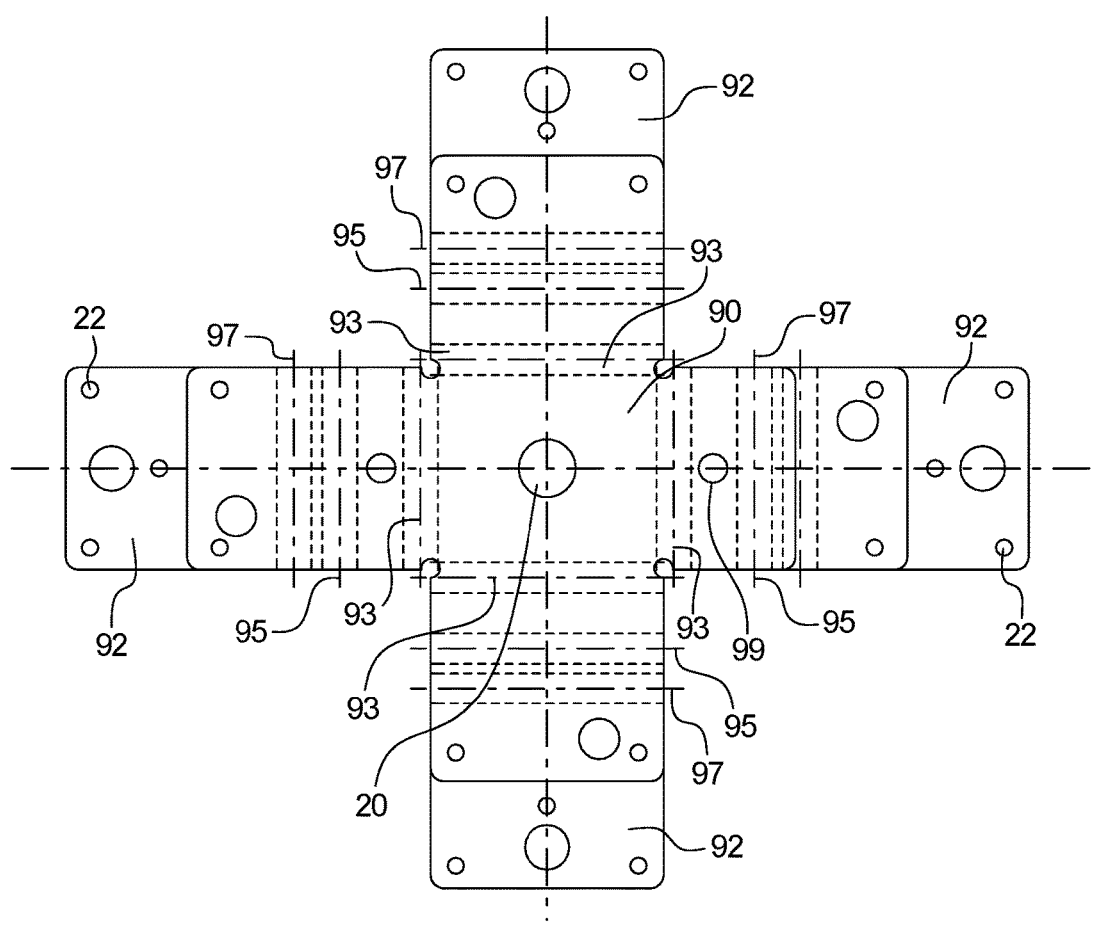
FIG. 5 is a plan view of a blank for forming the end cap.
Figure 7A:
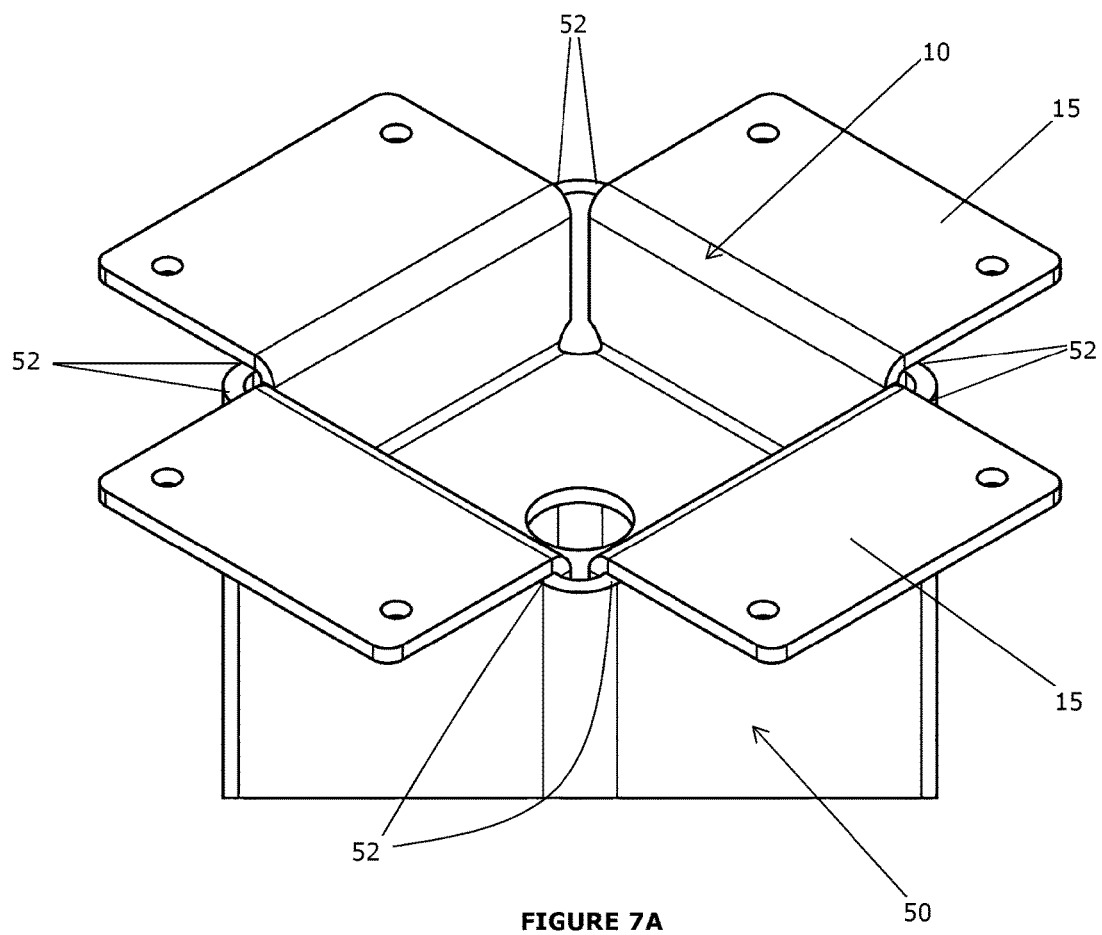
FIG. 7A is a perspective view showing the end cap fitted to the column upper end and assuming the same configuration as shown in FIG. 4.
Figure 7B:
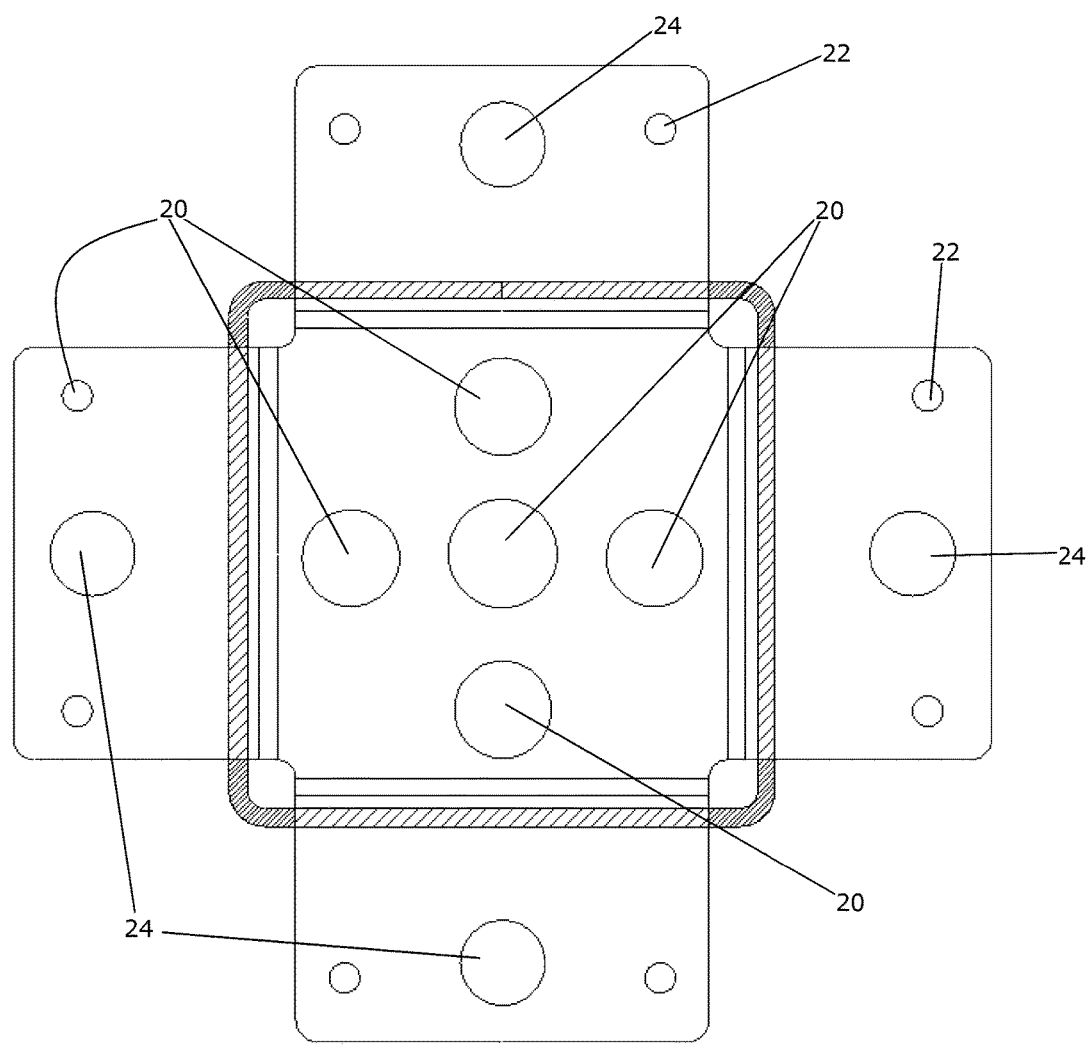
FIG. 7B is a plan view showing the end cap, fitted to the column upper end, having the same basic shape as shown in FIG. 7A though an exemplary alternative arrangement of holes for tie-down rods and fasteners.

Shown in FIG. 4 is a fitting, in the form of a cap 10, for coupling the column upper end 51 to the bearer 60. The cap 10 is bent from a shaped, punched piece of metal, such as steel, plate 1, which is shown in FIG. 5 and will be described in further detail later, and has a flat square bottom wall or base 11, sidewalls 12 extending upwardly from the bottom wall 11, and rim portions 13 which extend laterally outwardly from upper ends of the sidewalls 12. The bottom wall 11 and sidewalls 12 define a hollow, upwardly opening body 14 having a substantially square cross-sectional configuration, an exterior of which substantially matches the interior cross-sectional configuration of the column 50 whereby the body 14 can be downwardly inserted into the column upper end 51 to form a substantially size-for-size fit therewith, as shown in FIG. 7, the rim portions 13 resting against respective edge sections 52 of the column 50 to retain the cap 10, preventing it from falling through the column 50.

Figure 6:
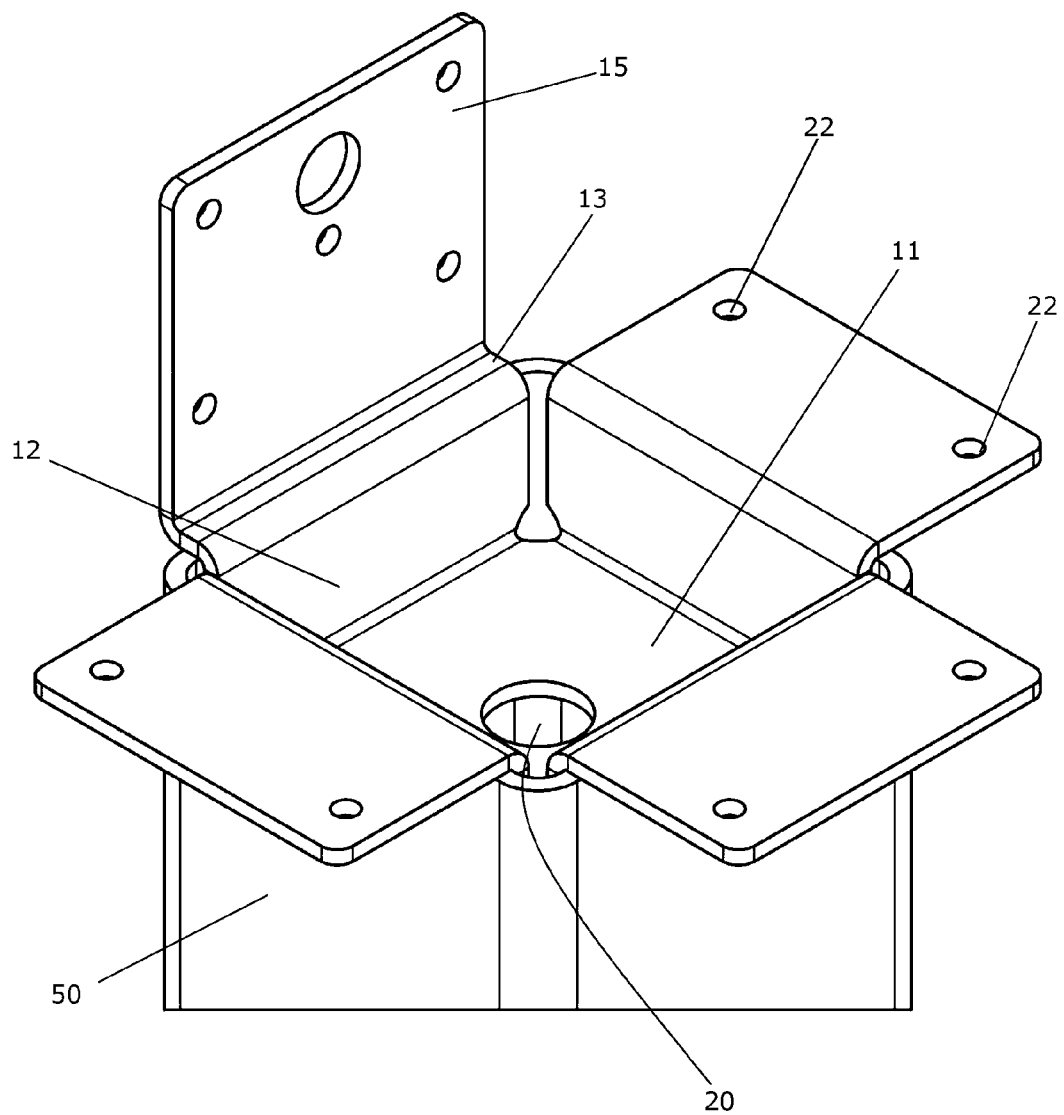
FIG. 6 is a perspective view of the end cap fitted to the column upper end and assuming an alternative configuration.
Figure 8A:
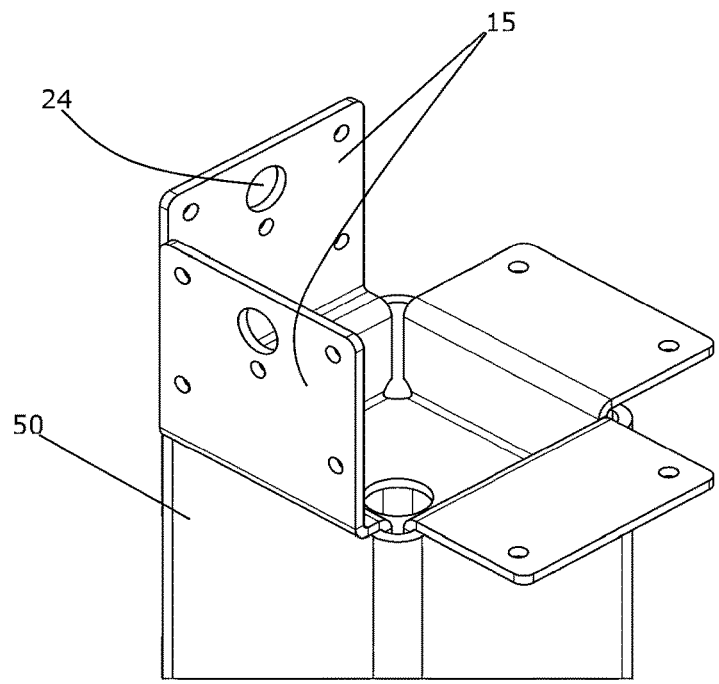
FIG. 8A is a perspective view showing the end cap fitted to the column upper end and assuming another alternative configuration.
Figure 8B:
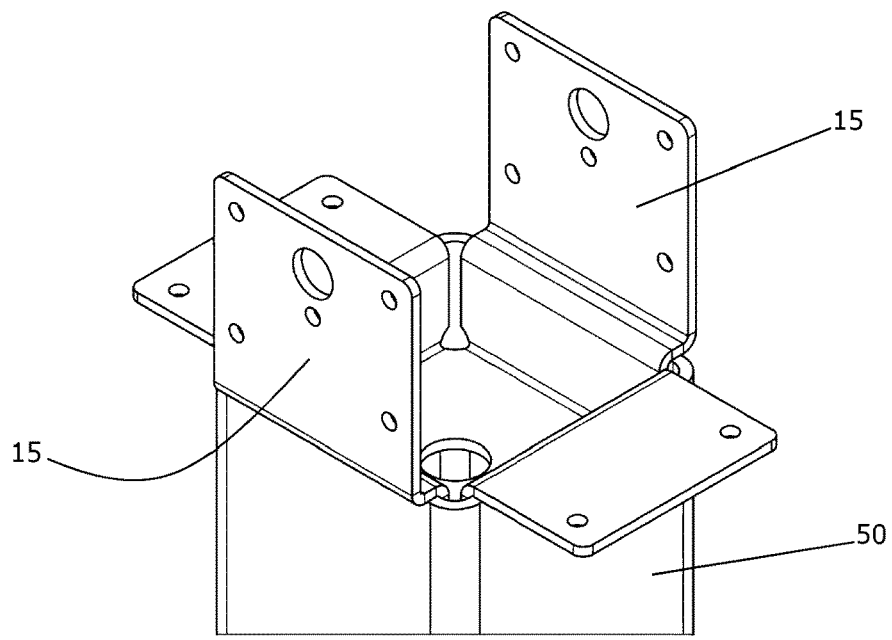
FIG. 8B is a perspective view showing the end cap fitted to the column upper end and assuming yet another alternative configuration.

The cap 10 further comprises flange portions 15 integrally formed with, and projecting from distal ends of, respective ones of the rim portions 13. The orientations of the flange portions 15 may vary without departure from the present disclosure. For example, each of the flange portions 15 may extend laterally outwardly, perpendicular to the sidewall 12 to which it connects, as shown in FIG. 4. Alternatively, referring to FIG. 6, a bend may be formed between one of the flange portions 15 and the rim portion 13 to which it connects, such that that flange portion 15 is parallel to, though laterally outwardly offset from, the side wall 12 to which it is connected via the rim portion 13. Alternatively, such a bend may be formed at each of two flange portion 15 rim portion/rim 13 junctions, whereby two of the four flange portions 15 extend upwardly instead of laterally outwardly. Those two flange portions 15 may be adjacent flange portions 15, as shown in FIG. 8A, or opposite flange portions 15, as shown in FIG. 8B.

At least one hole 20 is formed through the bottom wall, the or each hole being positioned to receive a respective tie-down rod 65, as will be described in further detail later. Also, each flange portion 15 is configured with one or more holes 22 through which can be inserted a fastener, typically a bolt, for securing the flange portion 15 against the bearer 60, the laterally projecting flange portions 15 being receivable against a bottom face of the bearer 60, and the upright flange portions 15 being receivable against side faces, or possibly an end face, of bearer 60.

One or more of the flange portions 15 may additionally be configured with at least one hole 24 through which, if the flange portion 15 is orientated horizontally, there may pass a respective tie-down rod (not shown), which is external to the column 50, used to provide tie-down to the bearer 60/cassette 100. Such external tie-down may be readily established once the overlying structure is in place.

Figure 9:
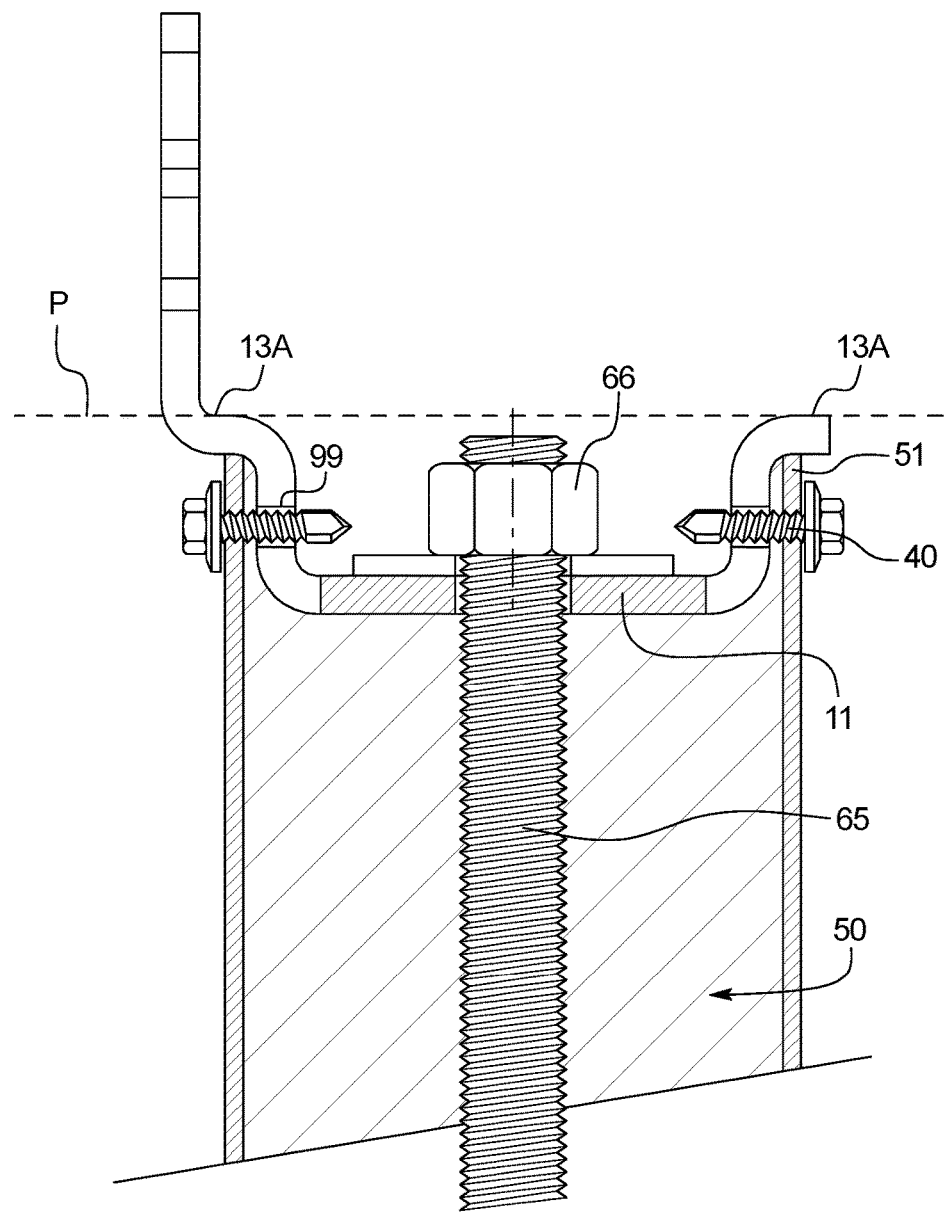
FIG. 9 is a side elevation view showing an end cap embodying the present disclosure fitted to the column upper end and tied town by means of an internal tie down rod and securing nut.

The cap 10, because the body 14 thereof fits into the column upper end 51 and the rim portions 13 engage the edge sections 52 at that end, is positively located to provide both bearing and shear resistance to the bearer 60 and thus the cassette 100 supported by that bearer, even without any fixing of the cap 10 to the column 50. Referring to FIG. 9, where an internal tie-down rod 65 is to be used within the column 50, the upwardly opening hollow configuration of the body 14 permits an upper end of the rod 65 and a nut 66, screwed onto that end to transfer from it tie-down load into the cap base 11, to be recessed below a plane P in which lie upwardly facing surfaces 13A of the rim portions 13, against which surfaces an underside/bottom face of the bearer 60 is received, so that the rod end and nut 66 are "below flush" and thus do not interfere with the engagement between the rim portions 13 (and any laterally extending flange portion(s) 15) and the bearer underside. As an alternative or in addition to one or more tie-down rods 65/securing nuts 66, fasteners, such as screws 40, may be received through one or more of the side walls 12 (which may be preformed with holes, such as punched holes 99, to receive such fasteners) to secure the/each side wall 12 to an adjacent wall of the column 50, the interconnections thus formed between the cap 10 and column 50 likewise being below the plane P.

The metal plate section/blank 1 from which the cap 10 is formed, shown in FIG. 5, assumes the shape of a "+" sign, comprising a square central portion 90, defining the base 11, and perpendicular tongue portions 92 extending from respective sides of the central portion 90, from each of which is to be formed a respective sidewall 12, flange portion 15 and rim portion 13 interconnecting the side wall 12 and flange portion 15. Punched into the plate 1 are the holes 20, 22, and/or 24 as discussed above.

Each side wall portion 12 is formed by folding a respective tongue portion 92 about a junction which it forms with the central portion 90, thereby forming a 90-degree bend at that junction, and laterally outwardly folding a section of the tongue portion 92 about a respective transverse axis 95, thereby forming a 90-degree bend whereby an upper end of the side wall portion 12 is defined and thus forming the rim portions 13, as well as any flange portion(s) 15 to be orientated horizontally in the finished cap 10. (It will be appreciated that folding about the junction can be effected either before or after bending about the axis 95.) Finally, the/each tongue portion 92 from which there is to be formed a flange portion 15 which projects upwardly is bent, through 90 degrees, about a transverse axis 97, whereby the/each upwardly projecting flange 15 is formed.

Advantageously, the cap 10 is formed without any need to join any one part thereof to any other part thereof. Because the cap 10 is formed without any welding, the corrosion resistance of the material forming the cap 10 is not impaired.

Figure 10:
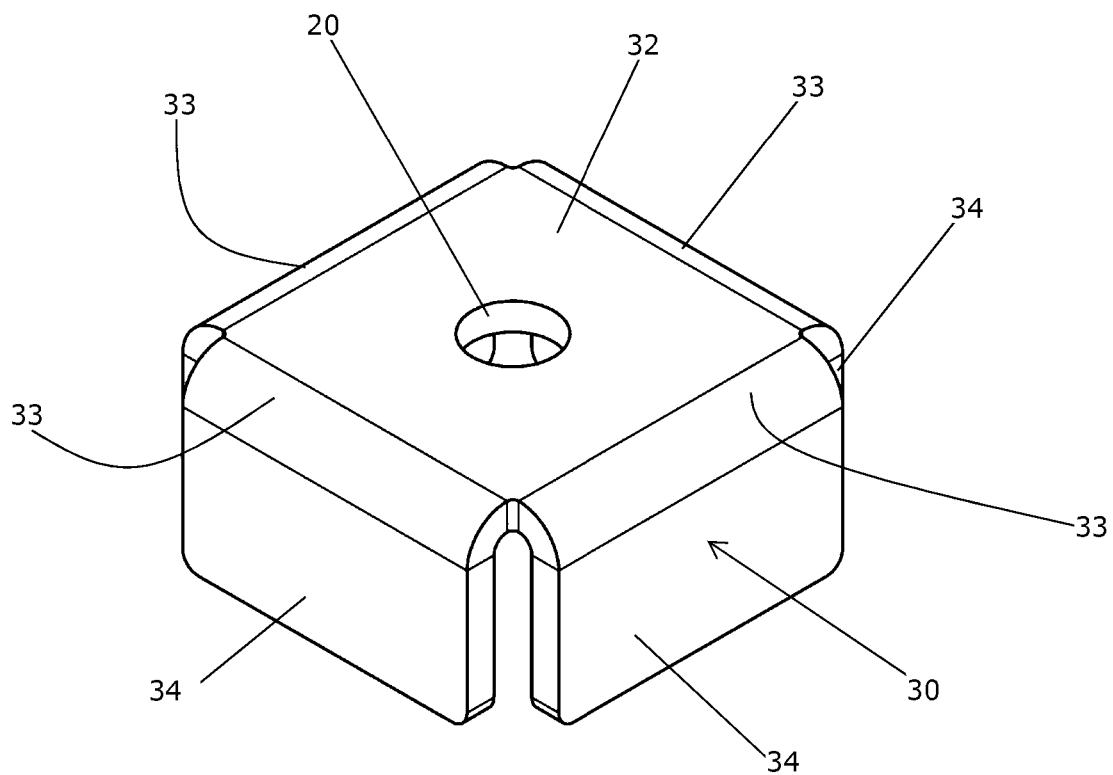
FIG. 10 is a perspective view of a load-bearing seat, usable in combination with the end cap, in accordance with one embodiment of the present disclosure.
Figure 11:
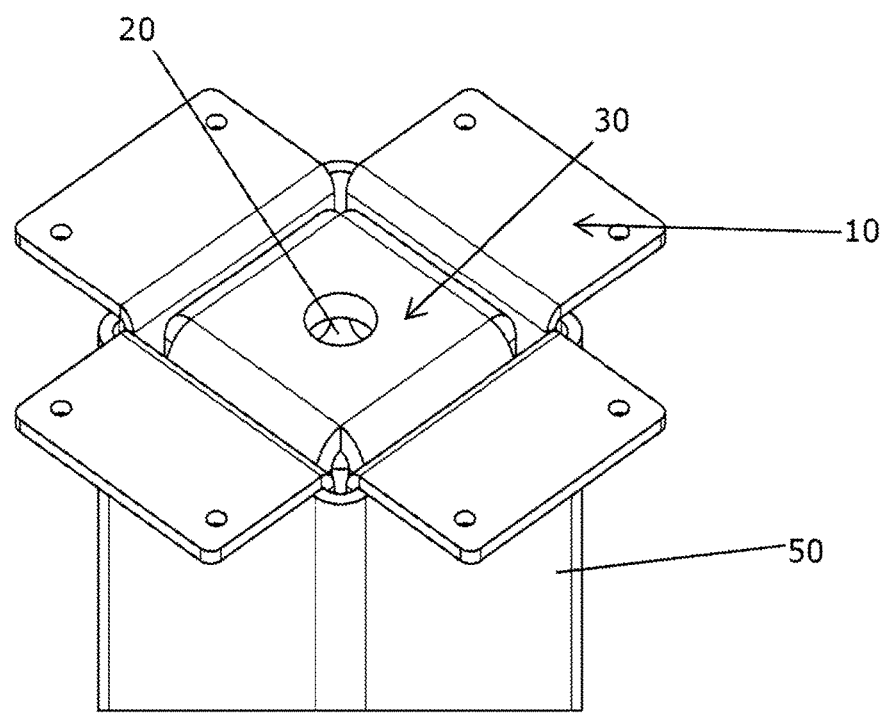
FIG. 11 is a perspective view showing how the seat nests within the end cap at the column upper end.
Figure 12:
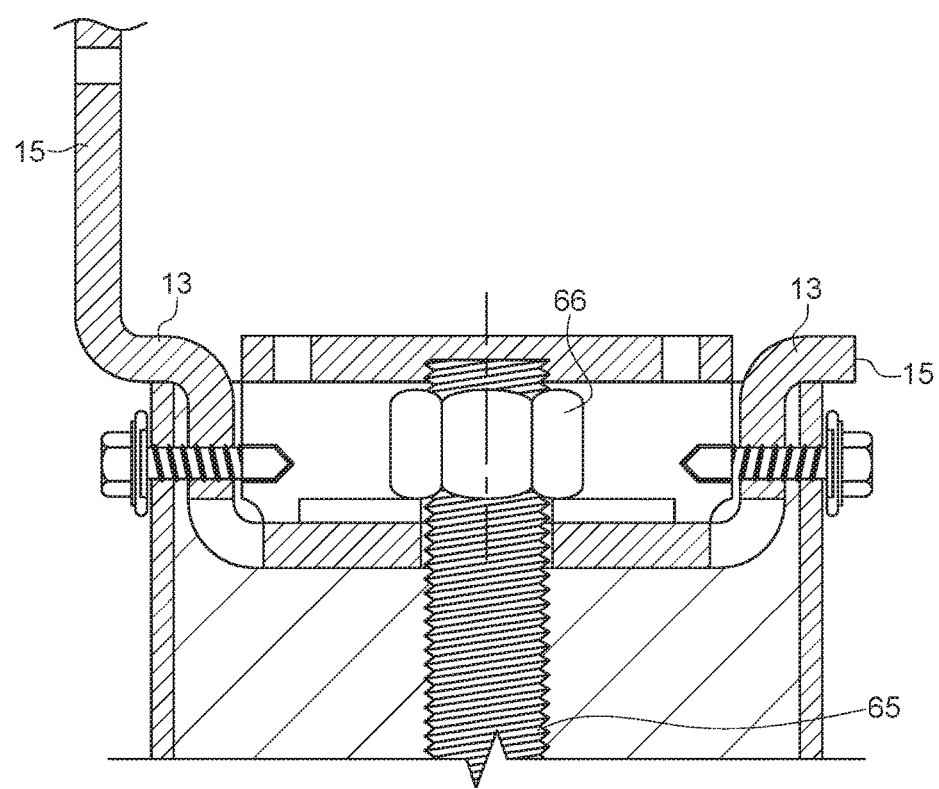
FIG. 12 is a side elevation view, corresponding to that of FIG. 9, showing the seat nested within the end cap.

Referring to FIG. 10, the cap 10 may be used in combination with a seat 30 according to a one embodiment of the present disclosure. The seat 30 is likewise formed from a single-piece blank (not shown), comprising a square central portion, which is to form a top wall 32 of the seat 30, and perpendicular rectangular tongue portions each of which is folded downwardly about a respective axis 33 defining a junction between the tongue portion and central portion 32, such that it forms a respective one of four upright sidewalls 34 of the seat 30. At least one tie-down rod hole 20' may, if required, be punched into the central portion, so as to align with a respective hole 20 in the cap base 11. Referring to FIG. 11, the seat 30 is dimensioned such that the outer faces of opposed ones of the side walls 34 have a separation approximately the same as (but slightly smaller than) a separation of inner faces of opposed ones of the cap sidewalls 12 such that the seat 30 forms a substantially size-for-size fit within the cap 10 when downwardly inserted into the body portion 14. The side walls 34, lower ends of which are received against the cap base 11, are dimensioned such that an upwardly facing exterior surface of the seat top wall 32 is substantially flush with the rim portion upper surfaces 13A, thereby lying in the plane P.

Advantageously, the seat 30, which can be used with the fitting 10 in any of the alternative configurations it may assume, thus receives thereagainst the underside of the bearer 60, providing, in addition to the rim portions 13, area which bears load from the bearer 60. Because the seat 30 is hollow and downwardly opening, it can accommodate the/each tie rod upper end/securing nut 66 therewithin.

A top washer may be interposed between a given securing nut 66 and the fitting base or seat top wall.

The column cap 10 has a number of advantages over conventional column caps. Firstly, conventional column caps are generally of a welded construction, and must thus be subjected to a corrosion protection step (typically hot-dip galvanizing), because of the displacement of any surface corrosion protection by the welding process. Consequently, there can as many as five processes (comprising cutting, punching/drilling, folding, welding and galvanizing) in their fabrication, with the final product being very specific in its application. The column cap 10 maintains the surface corrosion protection already incorporated the blank/plate 1 since there is no welding. Some conventional caps are made of relatively thick material to facilitate and hasten welding, though the additional material adds unnecessary cost and weight in many instances. Also, the blank 1 enables for several variations in the configuration of the cap 10 required on site to enable the cap 10 to secure to different types and parts of overlying structure—e.g., at corners; along edges; at internal locations; at side, top, or bottom faces; and to timber and/or steel components.

Furthermore, the cap 10 can be fixed down to the supports and up to the overlying structure in a number of ways that are appropriate to the exact load requirements from very small to very large, thus always providing a cost-effective option. Some examples are as follows:

a. It can be fixed down to the column with one or more screws from the side under small uplift loads.

b. It can be fixed down with a tie-down rod/bolt for midrange loads, with the top of the securing nut being below flush, along with the seat if employed, whereby there is no obstruction to the support of the overlying structure.

c. The inclusion of the tie-down rod holes enables, in cases of extreme uplift, one or more tie-down rods, internal and/or external to the column 50, to pass through the cap 10 directly from the foundation to the upper structure, without the configuration of the top of the cap being affected.

The ability of the cap 10 to resist a range of uplift loads has been detailed above, though, of the foundations supporting a building, a number are required to resist higher-than-usual downward loads, usually dead and live loads. It is therefore not economical to build this additional strength into all of the supports, but rather is appropriate to apply that strength only those supports that require it. Use of the seat 30 achieves the increased strength requirement only where necessary (e.g., in the case of timber bearers). The seat 30 is simply dropped into place, significantly increasing the bearing area. The top wall of the seat 30 may, of course, be configured with the same (alternative) tie-down rod hole pattern as that applied to the base of the fitting 10 shown in FIG. 7B. The shape of the seat 30 is such that it does not clash with the tie-down securing nut 66 should it be fitted.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the present disclosure. Thus, the present disclosure should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The claims defining the invention are as follows:

1. A building unit support fitting comprising:
    a body portion sized and shaped to be received in an open upper end of an at least partially hollow column; and
    multiple rim portions that each extend laterally outwardly from an upper end of the body portion, the multiple rim portions configured to engage edge sections of the at least partially hollow column,
    wherein the body portion and the multiple rim portions of the building unit support fitting are configured to couple the at least partially hollow column to a building unit support by positioning the body portion in the open upper end of the at least partially hollow column.

2. The building unit support fitting of claim 1, wherein the body portion is sized and shaped such that the body portion engages interior walls of the at least partially hollow column to preclude rotation of the building unit support fitting about a longitudinal axis of the at least partially hollow column when the body portion is received in the open upper end of the at least partially hollow column.

3. The building unit support fitting of claim 1, wherein the body portion and the rim portions are formed from a single plate.

4. The building unit support fitting of claim 1, further comprising a flange portion that extends from a laterally outer end of one of the rim portions.

5. The building unit support fitting of claim 4, wherein the flange portion extends from the one of the rim portions either upwardly or laterally outwardly.

6. The building unit support fitting of claim 5, wherein the flange portion is integrally formed with the one of the rim portions.

7. The building unit support fitting of claim 6, wherein the flange portion defines a fastener-receiving hole therethrough to facilitate securing the flange portion to the building unit support.

8. The building unit support fitting of claim 1, wherein the body portion includes a base and four side walls integrally formed with the base and oriented generally perpendicular to the base such that the base and the four side walls form a cavity, wherein the rim portions include four rim portions each integrally formed with a different one of the four side walls, the building unit support fitting further comprising four flange portions each integrally formed with a different one of the rim portions.

9. The building unit support fitting of claim 8, wherein one of the flange portions is oriented generally perpendicular to the base and another one of the flange portions is oriented generally parallel to the base, wherein each of the flange portions defines a fastener-receiving opening therethrough to facilitate securing the flange portion to the building unit support.

10. The building unit support fitting of claim 1, wherein the body portion defines a tie-down-rod-receiving hole therethrough sized to receive a tie-down rod.

11. The building unit support fitting of claim 1, wherein the body portion includes multiple side walls and one of the side walls defines a fastener-receiving hole therethrough to facilitate securing the body portion to the at least partially hollow column.

12. An assembly comprising:
  a fitting configured to facilitate coupling an at least partially hollow column to a building unit support, the fitting comprising:
    (1) a body portion sized and shaped to be received in an open upper end of the column; and
    (2) multiple rim portions that each extend laterally outwardly from an upper end of the body configured to engage edge sections of the column when the body portion is received in the open upper end of the column; and
  a seat receivable in the body portion such that an uppermost upwardly facing surface of the seat is substantially flush with upwardly facing surfaces of the rim portions.

13. The assembly of claim 12, wherein the body portion includes a body base and four body side walls integrally formed with the body base and oriented generally perpendicular to the body base such that the body base and the four body side walls form a body cavity, wherein the rim portions include four rim portions each integrally formed with a different one of the four body side walls, the fitting further comprising four flange portions each integrally formed with a different one of the rim portions.

14. The assembly of claim 13, wherein the seat includes a seat base and multiple seat side walls connected to the seat base, the seat base and the seat side walls forming a seat cavity.

15. The assembly of claim 14, wherein the seat is receivable in the body cavity such that the seat side walls abut the body side walls.

16. The assembly of claim 14, wherein one of the seat side walls defines a fastener-receiving hole therethrough to facilitate securing the seat to the column.

17. The assembly of claim 16, wherein one of the body side walls also defines a fastener-receiving hole therethrough to facilitate securing the fitting to the column.

18. The assembly of claim 12, wherein the seat defines a tie-down-rod-receiving hole therethrough sized to receive a tie-down rod.

19. The assembly of claim 18, wherein the body portion also defines a tie-down-rod-receiving hole therethrough sized to receive the tie-down rod.

20. The assembly of claim 12, further comprising the column, wherein the body portion is receivable in the open upper end of the column such that the rim portions engage the edge sections.

21. A fitting for coupling an at least partially hollow column to a building unit support, the fitting comprising:
  a body portion sized and shaped to be received in an open upper end of the column; and
  multiple rim portions that each extend laterally outwardly from an upper end of the body portion, the multiple rim portions configured to engage edge sections of the column when the body portion is received in the open upper end of the column,
  wherein the body portion includes a base and four side walls integrally formed with the base and oriented generally perpendicular to the base such that the base and the four side walls form a cavity, wherein the rim portions include four rim portions each integrally formed with a different one of the four side walls, the fitting further comprising four flange portions each integrally formed with a different one of the rim portions.

22. A fitting for coupling an at least partially hollow column to a building unit support, the fitting comprising:
  a body portion sized and shaped to be received in an open upper end of the column, wherein the body portion includes multiple side walls and one of the side walls defines a fastener-receiving hole therethrough to facilitate securing the body portion to the column; and
  multiple rim portions that each extend laterally outwardly from an upper end of the body portion, the multiple rim portions configured to engage edge sections of the column when the body portion is received in the open upper end of the column.

* * * * *